(12) United States Patent
McNulty et al.

(10) Patent No.: US 7,152,911 B1
(45) Date of Patent: Dec. 26, 2006

(54) VEHICLE BED AND CROSS RAIL ATTACHMENT

(75) Inventors: Frank G. McNulty, Rochester Hills, MI (US); Edward J. Engler, Farmington Hills, MI (US)

(73) Assignee: Pullman Industries, Inc., Troy, MI (US)

( * ) Notice: Subject to any disclaimer, the term of this patent is extended or adjusted under 35 U.S.C. 154(b) by 0 days.

(21) Appl. No.: 11/205,735

(22) Filed: Aug. 17, 2005

(51) Int. Cl.
*B62D 25/20* (2006.01)
(52) U.S. Cl. .............................. 296/184.1; 296/193.07
(58) Field of Classification Search ............. 296/183.1, 296/184.1, 193.07
See application file for complete search history.

(56) References Cited

U.S. PATENT DOCUMENTS

| 5,575,525 A * | 11/1996 | Walworth et al. ........ 296/184.1 |
| 6,109,684 A * | 8/2000 | Reitnouer .................. 296/184.1 |
| 6,347,454 B1 * | 2/2002 | Jurica et al. ................ 29/897.2 |
| 6,814,397 B1 * | 11/2004 | Henderson et al. ...... 296/184.1 |
| 2004/0100126 A1 * | 5/2004 | Kawabe et al. ........ 296/193.07 |
| 2005/0236867 A1 * | 10/2005 | McNulty et al. ......... 296/183.1 |

OTHER PUBLICATIONS

Exhibit A (prior art construction by Ford Motor Corporation), 1 page.

* cited by examiner

*Primary Examiner*—Jason Morrow
(74) *Attorney, Agent, or Firm*—Flynn, Thiel, Boutell & Tanis, P.C.

(57) ABSTRACT

A bed arrangement for a vehicle including a horizontally large floor member defined by a thin metal sheet having a plurality of raised stiffening ribs extending lengthwise thereof. The floor member has a cantilevered edge flange extending along a lengthwise side edge thereof, which edge flange protrudes downwardly below a bottom surface of the floor member. A hat-shaped cross rail is disposed transversely under said floor member, and has a pair of top flanges which supportingly engages the bottom surface of the floor member. The cross rail, where it crosses the edge flange, has a depression formed therein to provide clearance for the edge flange. The top flanges having flange sections which are deformed downwardly to define the profile of the depression while maintaining the continuity of the top flanges as they extend lengthwise of the cross rail.

16 Claims, 8 Drawing Sheets

VEHICLE BED AND CROSS RAIL ATTACHMENT

FIELD OF THE INVENTION

This invention relates to a bed construction for a vehicle, particularly a pickup truck, and more specifically to an improved floor and cross rail constructional arrangement.

BACKGROUND OF THE INVENTION

The bed assembly of pickup trucks typically include a horizontally large floor, the lengthwise extending side edges being joined to upright inner side walls, and the transverse front edge being joined to an upright front wall. The horizontally large floor is normally constructed from multiple pieces or panels, including a main or center floor panel extending the full length of the bed and having a width which is generally slightly less than the width between the wheel well openings. The floor also includes side floor panels which extend sidewardly between the center floor panel and the adjacent inner side walls. The side floor panels typically have wheel well openings formed therein, and wheel well housings close the openings and are secured to the side floor panels and the adjacent upright inner side walls.

In a conventional bed assembly, similar to that summarized above, the floor panels are conventionally stamped or pressed from thin metal sheet so as to provide the floor panels with a plurality of generally parallel ribs which extend lengthwise of the bed to provide appropriate strength and stiffening. In recent years, many of the floor panels, particularly at least the center floor panel, are roll-formed to provide improved performance characteristics both with respect to strength and economy.

In the construction of a bed assembly employing a floor defined by multiple floor panels, as summarized above, it is conventional to provide the lengthwise extending edges of the floor panels, where such edges abut, such as where the outer longitudinal side edges of the center panel abut the respective inner longitudinal side edges of the side floor panel, with downward flanges which preferably extend lengthwise of the floor panel. These flanges are positioned to substantially abut one another during assembly of the floor and are fixedly joined, such as by welding. These edge flanges, due to their being turned downwardly relative to the horizontal orientation of the floor panel, provide significantly increased strength and rigidity to the floor. However, these downward flanges create significant interference problems at locations where they cross the underlying cross rails. For example, in constructions where the flanges protrude downwardly from the base or lower level of the ribbed floor panel, the flanges must be notched throughout the height thereof at locations corresponding to the cross rails so as to eliminate interference. This severe notching of the flanges, however, creates an obvious and undesirable weakness in the floor at this area, and in addition requires additional manufacturing operations and manipulations.

To improve on the undesired weakening created by notching the downward flanges associated with the base level of the floor, another construction has been developed wherein the edge flanges on the floor panels are formed so as to protrude downwardly from the top wall level associated with the floor panel ribs. That is, the floor panels are formed so that the longitudinal edges define partial upwardly-protruding ribs, and the edge flange then protrudes downwardly from the top wall of this edge rib. The edge flange, however, typically has a width (i.e. height) which is greater than the height of the ribs formed in the floor panel, so that the edge flange still requires that a portion of the height thereof be removed or recessed to provide appropriate clearance for the cross rails when the floor is fixedly seated thereon. This construction does provide at least some partial edge flange extending along the entire length of the floor panel and provides improved strength and rigidity. This latter construction, however, results in the seam, namely the line created where the longitudinally adjacent edge flanges abut, being disposed in a raised rib, rather than in a valley between adjacent ribs, and it has been suggested that this causes the seam to be more visible and less aesthetically desirable when incorporated into the finished vehicle bed assembly.

In a continuing effort to improve on the above construction, particularly as it relates to the fixed joining of longitudinal edges between sidewardly adjacent floor panels, it has also been suggested to provide a small notch transversely across the top of the cross rail so as to accommodate therein the edge flanges of the floor panels. While such notch does provide improved characteristics with respect to the construction of the floor panels and hence makes it unnecessary to notch or recess the edge flanges, nevertheless the presence of the notch in the cross rail provides a reduction in the strength and integrity of the cross rail.

In a known construction of the type employing a notch or depression in the cross rail, the cross rail is suitably shaped so that the notch or depression opens downwardly from the upper surface thereof at a location below the edge flanges of the floor panels, with the forming of the notch or depression also causing a downward deformation of the top flanges on the cross rail. With this known construction, however, while this does provide improved clearance for the edge flanges of the floor panels, nevertheless the depression also reduces the available contact between the floor panels and the top flanges of the cross rail with respect to permitting proper spot welding therebetween. This known construction hence typically only permits spot welding in close proximity to the edge flanges along one side thereof between the cross rail and one of the floor panels. On the other floor panel, however, there is insufficient contact between the base of the floor panel and the top flange of the cross rail to permit spot welding in close proximity to the edge flanges, and hence the spot weld is typically provided a substantial transverse distance from the edge flange, namely on the other side of the adjacent upstanding rib which is closest to the edge flange. The spot welds associated with the adjacent floor panels, which spot welds attempt to sidewardly straddle the seam defined by the adjacent edge flanges, are hence widely spaced apart and this impacts the strength and integrity of the joint.

Accordingly, it is an object of this invention to provide an improved bed construction for a vehicle, such as a pickup truck, which construction addresses the problems summarized above and provides an improved constructional relationship between the floor, as defined by a plurality of floor panels, and its fixed association with and support by a plurality of underlying cross rails.

More specifically, the present invention relates to an improved bed assembly for a pickup truck having a horizontally large bed or floor defined by a plurality of separate floor panels, preferably a main center floor panel which extends sidewardly between and joins to right and left side floor panels, the latter defining therein right and left wheel well openings respectively. The floor panels are supported on and fixedly secured to a plurality of cross rails which extend transversely under the floor, which cross rails conventionally have an upwardly-opening hat-shaped cross section. At least the main center floor panel is preferably provided with a plurality of upwardly-protruding reinforcing ribs extending lengthwise of the panel, with the ribs being disposed in generally parallel but sidewardly spaced relationship. The opposite longitudinally-extending side edges of the center floor panel are defined by the base wall of the center panel, that is, the floor elevation which corresponds to the valley between adjacent ribs, and are additionally provided with a downwardly-cantilevered edge flange formed so as to extend substantially continuously lengthwise therealong. The edge flange typically has a width (i.e. height) which is greater than the height of the ribs relative to the base wall. Similar such edge flanges are formed on and extend lengthwise along the inner longitudinal side edges of the right and left floor panels, whereby the opposed edge flanges abut and are secured together, such as by a plurality of spot welds, to rigidly join the floor panels together. When joined together, the seam defined at the abutting side edges of the floor panels is disposed at the base of the floor, rather than in the top of a rib. To accommodate the significant downward protrusion of the adjacent abutting edge flanges, each cross rail at a location corresponding to the edge flanges is provided with a smoothly configured depression formed downwardly from the upper surface thereof. The depressions are formed in the cross rails by deforming the upper portion of the cross rail, while not effecting any significant material removal, whereby the top flanges of the hat-shaped cross rail extend continuously throughout the length of the cross rail and, at the region of the depression, are smoothly and gradually deformed downwardly and then upwardly in a continuous and smooth manner so as to create the depression while at the same time maintaining the continuous lengthwise-extension of the top flanges while maintaining them free of abrupt corners or directional changes. The hat-shaped cross section of the cross rail is hence maintained at all locations throughout the length thereof, even in the region of the depression, whereby the depression readily accommodates the downwardly protruding abutting edge flanges on the floor panels while at the same time the cross rail maintains a high level of strength and structural integrity. The depressions in the cross rails can be formed by reshaping of the cross rail in a suitable stamping or forming die. Alternatively, roll forming of the cross rails is preferred, and use of a variable roll forming process can be adopted to permit forming of the depressions in the cross rails during the roll forming thereof.

In the improved construction, as aforesaid, the downturned abutting edge flanges, where they transversely intersect the cross rails, can be provided with a shallow recess opening upwardly from the lower free edge of the respective edge flange to provide sufficient clearance between the edge flange and cross rail, thereby minimizing the required depth of the depression, which in turn minimizes the extent of the depression in the lengthwise direction of the cross rail. The recess preferably has a depth which is less than one-half the height of the edge flange to maintain the lengthwise continuity of the edge flange along the floor panel, and hence maintain desired strength and rigidity lengthwise along this edge.

In the improved bed construction of the present invention, as aforesaid, the center floor panel is preferably provided with depressions formed at select locations in the raised ribs so as to facilitate securement of the center floor panel to the cross rails, such as by spot welding. More specifically, the outermost rib located adjacent each longitudinal side edge of the center floor panel, at locations corresponding to the cross rails, is preferably deformed downwardly to create a deformed region which opens inwardly from the base floor adjacent the longitudinal side edge and which is substantially coplanar therewith. This depression enables the depressed wall to engage upper surfaces of the cross rail top flanges directly adjacent one end of the depression so as to permit spot welding to the top flanges. This provides desired strength and rigidity with respect to connection of the center floor panel to the cross rails, while at the same time enabling the depressions to extend lengthwise of the cross rail through a sufficient extent to permit a gradual change in curvature of the cross rail top flanges throughout the length of the depression, thereby minimizing the effect of the depression on the structural characteristics of the cross rail.

Other objects and purposes of the present invention will be apparent to persons familiar with constructions of this type upon reading the following specification and inspecting the accompanying drawings.

Certain terminology will be used in the following description for convenience in reference only, and will not be limiting. For example, the words "upwardly", "downwardly", "rightwardly" and "leftwardly" will refer to directions in the drawings to which reference is made. The word "front" as used in association with the floor or bed assembly will be used to designate that end which is closest to the front of the vehicle. The words "inwardly" and "outwardly" will refer to directions toward and away from, respectively, the geometric center of the bed assembly and designated parts thereof. Said terminology will include the words specifically mentioned, derivatives thereof, and words of similar import.

DETAILED DESCRIPTION

Figure 1:
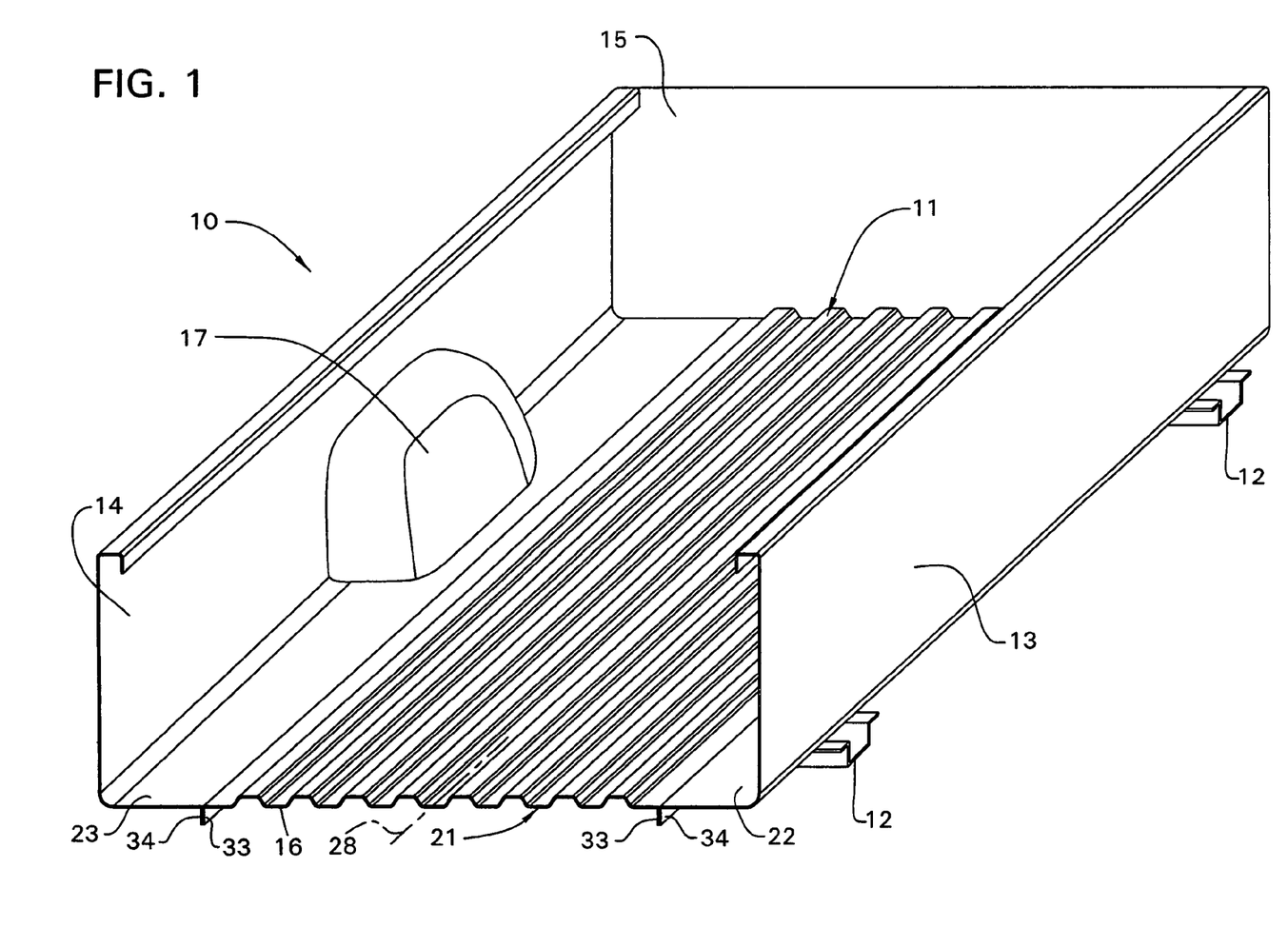
FIG. 1 is a fragmentary perspective view of a bed construction for a pickup truck incorporating therein a floor constructed from multiple floor panels.

FIG. 1 is a fragmentary illustration of parts of a vehicle bed assembly 10, such as for a pickup truck. The bed assembly 10 includes a large and substantially horizontally extending floor or bed 11 intended for supporting loads thereon. This floor or bed 11 is, in a conventional manner, supported on a plurality of generally parallel and sidewardly spaced cross or frame rails 12 which extend transversely beneath the floor, only two such rails being diagrammatically illustrated in FIG. 1. The bed assembly includes right and left inner side walls 13 and 14, respectively, which are fixedly interconnected to and protrude substantially perpendicularly upwardly from the floor 11 adjacent opposite longitudinally extending side edges thereof. The inner side walls 13–14 in turn, at front edges thereof, are rigidly joined to a front wall or panel 15 which is fixed to and protrudes substantially perpendicularly upwardly from the front edge of the floor 11. The rear edge 16 of the floor 11 is conventionally supported on a rear cross rail (not shown), and the rear cross rail in conjunction with upright rear posts (not shown) define a rear access opening for the bed assembly, which access opening is conventionally closed by a swingable tailgate (not shown).

The bed assembly 10 also typically includes right and left wheel well housings, only the left housing 17 being illustrated in FIG. 1. Such housings are fixedly secured around the edges of wheel clearance openings formed in the floor and the side walls as is conventional.

The floor 11 as associated with the present invention, and as is conventional, is formed from a plurality of separate preformed floor panels which fixedly cooperate to define the overall floor 11. In the floor associated with the bed construction of this invention, the floor 11 includes a main or center floor panel 21 which extends longitudinally throughout substantially the full length of the bed assembly. This center floor panel 21 preferably has a width which is normally slightly less than the transverse spacing between the opposed wheel well housings 17, whereby the center bed panel 22 in plan view hence has a substantially rectangular configuration.

The floor 11 also includes right and left side floor panels 22 and 23, respectively, which effectively extend sidewardly between the respective adjacent side edge of the center floor panel 21 and the respective adjacent inner side wall 13 or 14. The right and left side floor panels 22 and 23 have wheel well openings formed therein, the latter being enclosed by the respective wheel well housing 17.

The center floor panel 21 is preferably an integral and monolithic one-piece construction formed from thin metal (i.e. steel) sheet. The center floor panel 21 is provided with a plurality of reinforcing ribs 25 which are deformed upwardly from a planar base wall 24, with the ribs 25 preferably extending substantially throughout the lengthwise extent of the center floor panel. The reinforcing ribs 25 preferably have a shallow channel-shaped cross section which opens downwardly, with the individual rib being defined by a top wall 26 which is spaced upwardly a small distance above the base wall 24 and which is interconnected to the base wall by downwardly sloped side walls 27. A plurality of such ribs 25 are formed in generally parallel but sidewardly spaced relationship so that the ribs extend generally parallel to the longitudinally extending centerline 28 of the center floor panel. The ribs are preferably substantially uniformly sidewardly spaced apart and define valleys or depressions 29 between each sidewardly adjacent pair of ribs, the bottom wall of each valley being defined by the planar base wall 24.

The center floor panel 21 has opposite sides thereof defined by longitudinally-extending and parallel side edges 31. Each side edge 31 defines a downwardly turned edge flange 33 which is cantilevered downwardly and extends substantially continuously along the full lengthwise extent of the side edge, and which terminates in a lower free edge 37. The flange 33 protrudes downwardly in generally perpendicular relationship to the plane of the base wall 24, and this flange 33 at its upper end is joined to the base wall 24 through a rather sharp corner or bend. The base wall 24, adjacent the longitudinally extending side edge 31, defines a base wall section 32 which is coplanar with the base wall 24 and, throughout the longitudinal extent of the center floor panel, extends transversely between the downturned flange 33 and the adjacent reinforcing rib (that is, the reinforcing rib 25 positioned most closely adjacent the side edge of the center floor panel). The transverse width of this base wall section 32 is, as shown by FIG. 2, significantly less than the width of the base wall 24 associated with the valleys 29 defined between adjacent ribs 25.

Figure 2:
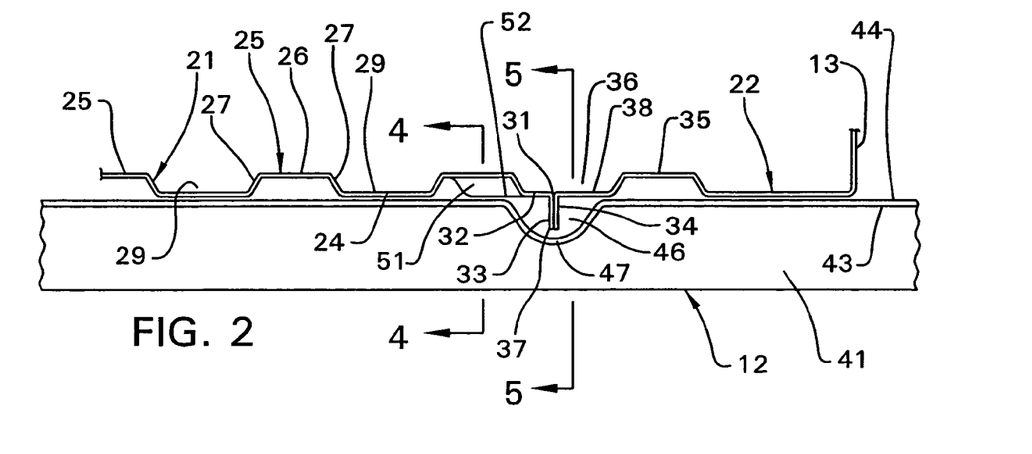
FIG. 2 is a fragmentary elevational view illustrating the manner in which center and side floor panels join and cooperate with an underlying cross rail according to the present invention.
Figure 3:
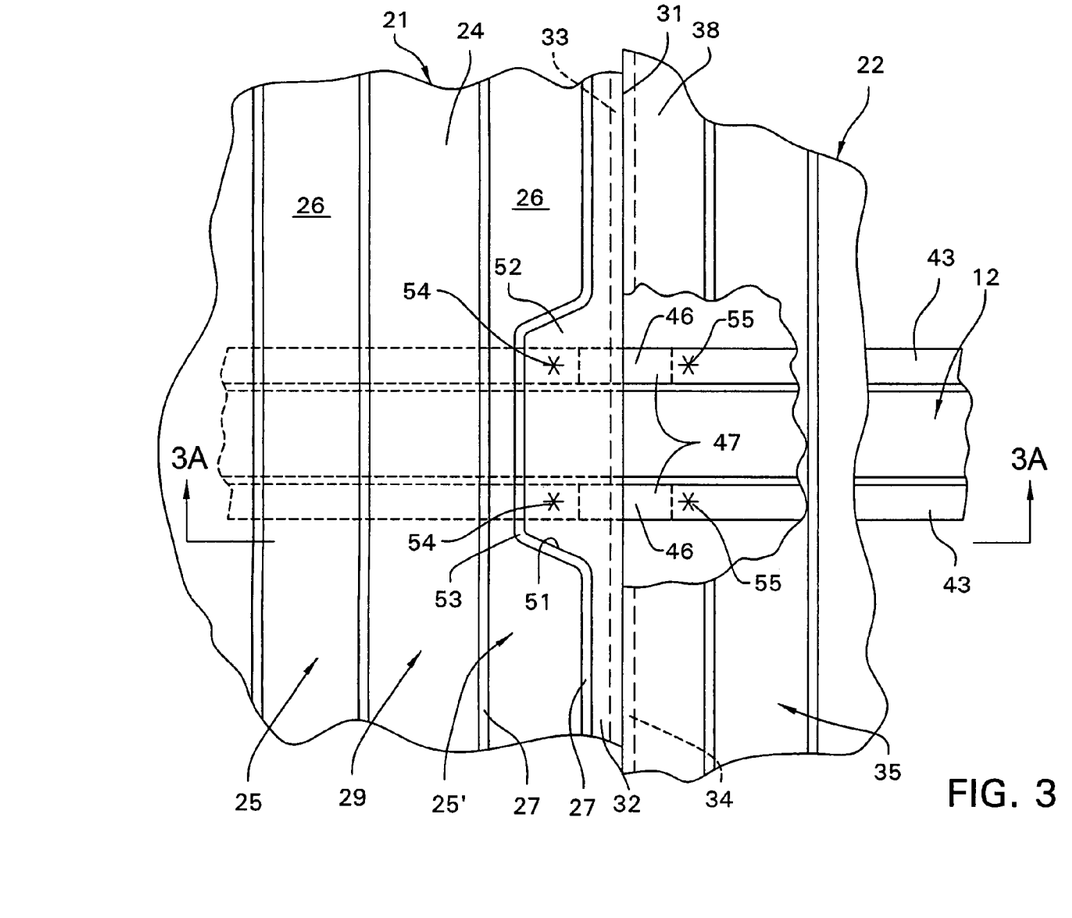
FIG. 3 is a fragmentary top view showing the seam region between the floor panels shown in FIG. 2, part of the side floor panel being broken away at the seam.
Figure 3A:
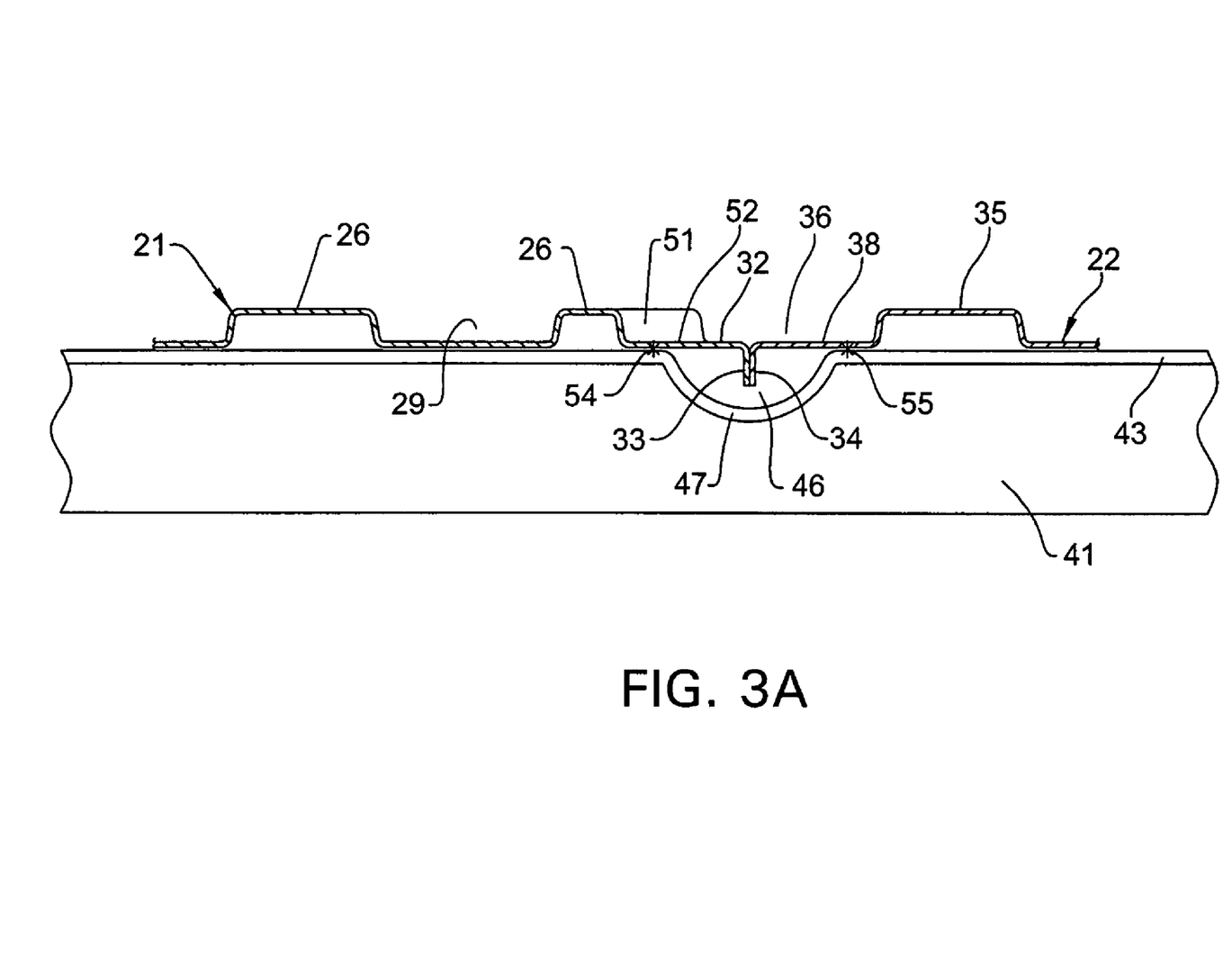
FIG. 3A is a fragmentary sectional view taken generally along line 3A—3A in FIG. 3 and showing the seam region between the adjacent floor panel edges and the cooperation of the floor panels with the underlining cross rail.

As illustrated by FIGS. 2, 3 and 3A, each of the side floor panels, such as the right side panel 22 illustrated in FIGS. 2 and 3, has a down-turned edge flange 34 associated with and extending lengthwise along the inner longitudinally-extending side edge thereof. The edge flange 34 is monolithically and integrally joined to the respective side floor panel 22, 23 and is cantilevered downwardly in generally perpendicular relationship. The edge flange 34 has generally the same vertical depth and extends generally parallel to the opposed edge flange 33 associated with the center floor panel 21. When the side floor panels 22, 23 are positioned so as to effectively abut opposite sides of the center floor panel, the opposed edge flanges 33 and 34 effectively abut as illustrated in FIG. 3A, and are suitably fixedly joined, such as by a plurality of spot welds positioned at selected intervals longitudinally along the flanges. This joined flange arrangement hence provides effective rigid joining of the floor panels, and more significantly provides the assembled floor with significantly increased rigidity and structural integrity.

The side floor panel 22, 23 can, as illustrated in FIGS. 2, 3 and 3A, be provided with one or more raised reinforcing ribs 35 extending longitudinally therealong, which ribs will typically terminate at or short of the wheel well housing. If provided, the rib 35 is preferably spaced transversely from the edge flange 34 so as to define a flat base wall region 38 which is substantially coplanar with the adjacent base wall section 32, which base wall sections 32 and 38 cooperate to define a valley 36 which is sized so as to be substantially the same or closely similar to the size of the valleys 29 defined between ribs 25 associated with the center floor panel 21. As illustrated by FIGS. 3 and 3A, the width of the base wall section 32 as defined between the outermost raised rib 25 and the respectively adjacent edge flange 33 is substantially smaller (i.e. narrower) than the width of the flat base wall section 38 as associated with the adjacent side floor panel 22, which flat base wall section 38 also extends transversely between the respective edge flange 34 and the adjacent raised reinforcing rib 35. By making the base wall section 38 of substantially greater width than the base wall section 32, while maintaining the width of the valley 36 as defined by the combined widths of these wall sections consistent with the width of the other valleys 29, the wall section 38 hence extends sufficiently transversely so as to create contact with the top flanges 43 of the cross rail adjacent one end of the depression 46, thereby permitting spot welding (as indicated at 55 in FIG. 3) between the base wall section 38 and the top flanges 43, as described in greater detail hereinafter. The longitudinally-extending seam defined by the opposed abutting edge flanges 33 and 34 is associated with the bottom or base wall of this valley 36, whereby the seam can be suitably caulked or otherwise filled, while at the same time being disposed in a position which is perceived to be less visually noticeable.

Figure 4:
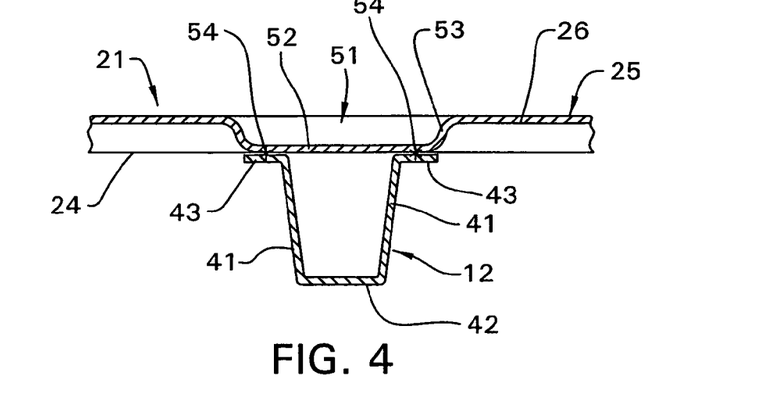
FIG. 4 is an enlarged fragmentary cross-sectional view taken generally along line 4—4 in FIG. 2.

The cross rails 12 which project transversely under and structurally support the floor 11 typically and preferably have an inverted hat-shaped cross section which, as illustrated by FIG. 4, is defined by a generally upwardly-opening channel-shaped profile or body defined by spaced side walls 41 which project upwardly from a bottom wall 42. The side walls 41, which may and frequently do slightly diverge as they project upwardly, terminate in top flanges 43 which are bent relative to the side flanges 41 so as to project in a generally horizontal plane. In the illustrated and preferred construction, the pair of flanges 43 project sidewardly in opposite directions, and specifically individually project outwardly away from the respective side wall 41. These top flanges 43 define thereon substantially horizontal and coplanar upper support surfaces 44 which provide direct supportive engagement with the underside of the floor 11, and more specifically provide direct supportive engagement with the underside of the base plates associated with the different floor panels, such as the base wall 24 of the center floor panel 21. The various floor panels 21, 22, 23 are fixedly secured to the cross frames 12 preferably by a plurality of spot welds which are created between the base walls of the floor panels, such as the base wall 24 of the center panel 21, and the top flanges 43 of the respective cross rail 12.

Each of the cross rails 12, at a location where the cross rail intersects the opposed connected edge flanges 33 and 34, is provided with a downwardly-formed recess or depression 46 (FIG. 2) formed in the upper portion of the cross rail 12. This depression 46 is positioned so as to project downwardly from the horizontal plane defined by the upper surfaces 44 of the top flanges 43, with the depression 46 projecting downwardly a significant extent into the upper portion of the side walls 41 so that the lowermost point of the recess is hence disposed at an elevation significantly below the normal horizontal elevation of the top flanges 43. The depression 46 extends transversely across the entire width of the cross rail 12 and hence, in actuality, constitutes a pair of identical depressions which are transversely aligned, one such depression being formed downwardly in each of the side walls 41 and its associated top flange 43.

While the depression 46 opens downwardly into the side walls 43 from the upper edge thereof and hence reduces the height of the side walls 41 in the region of the depression, this depression nevertheless does not result in any severing or removal of the top flanges 43. Rather, the formation of the depression is such that the top flanges 43, in the region of the depression, are deformed downwardly to define deformed flange sections 47 (FIG. 2) which correspond to the shape of the depression and which extend continuously along the periphery of the depression, with opposite ends of the deformed flange sections 47 being monolithically and integrally joined and smoothly merged into the horizontal top flanges 43 at opposite lengthwise-ends of the depression.

The depression 46 preferably has a configuration, as defined by its edge or outer profile, which is smoothly curved throughout the extent thereof so as to eliminate or at least greatly minimize any sharp bends or severe curvature changes. In this regard, the depression 46 and the deformed flange sections 47 which extend along the edge thereof are defined generally by a smoothly curved, upwardly-opening, concave curvature which, at opposite ends, namely where it joins to the horizontal top flanges 43, is reversely smoothly bent or curved so as to effect a smooth and continuous transition into the horizontal top flanges 43.

The curvature or shape of the depression 46 and deformed flange sections 47 will typically and preferably resemble an upwardly-opening arc which, at opposite ends, is reversely curved or bent so as to transition into the horizontal top flanges 43. The depression 46, as it extends in the lengthwise direction of the cross rail 12, will have a length which is substantially greater than its depth, which depth will be maintained at a minimum so as to provide solely the clearance necessary to accommodate the edge flanges 33, 34, whereby the bottom or lowest elevation of the depression will typically be at an elevation which is substantially above the elevational midpoint of the side walls 41.

Figure 5:
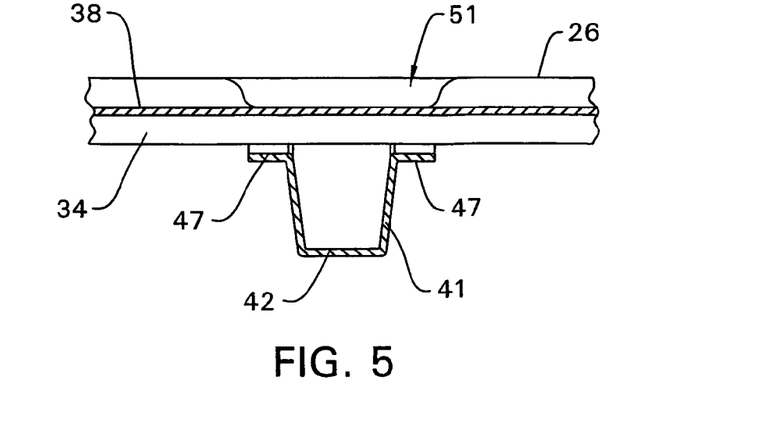
FIG. 5 is an enlarged fragmentary cross-sectional view taken generally along line 5—5 in FIG. 2.
Figure 6:
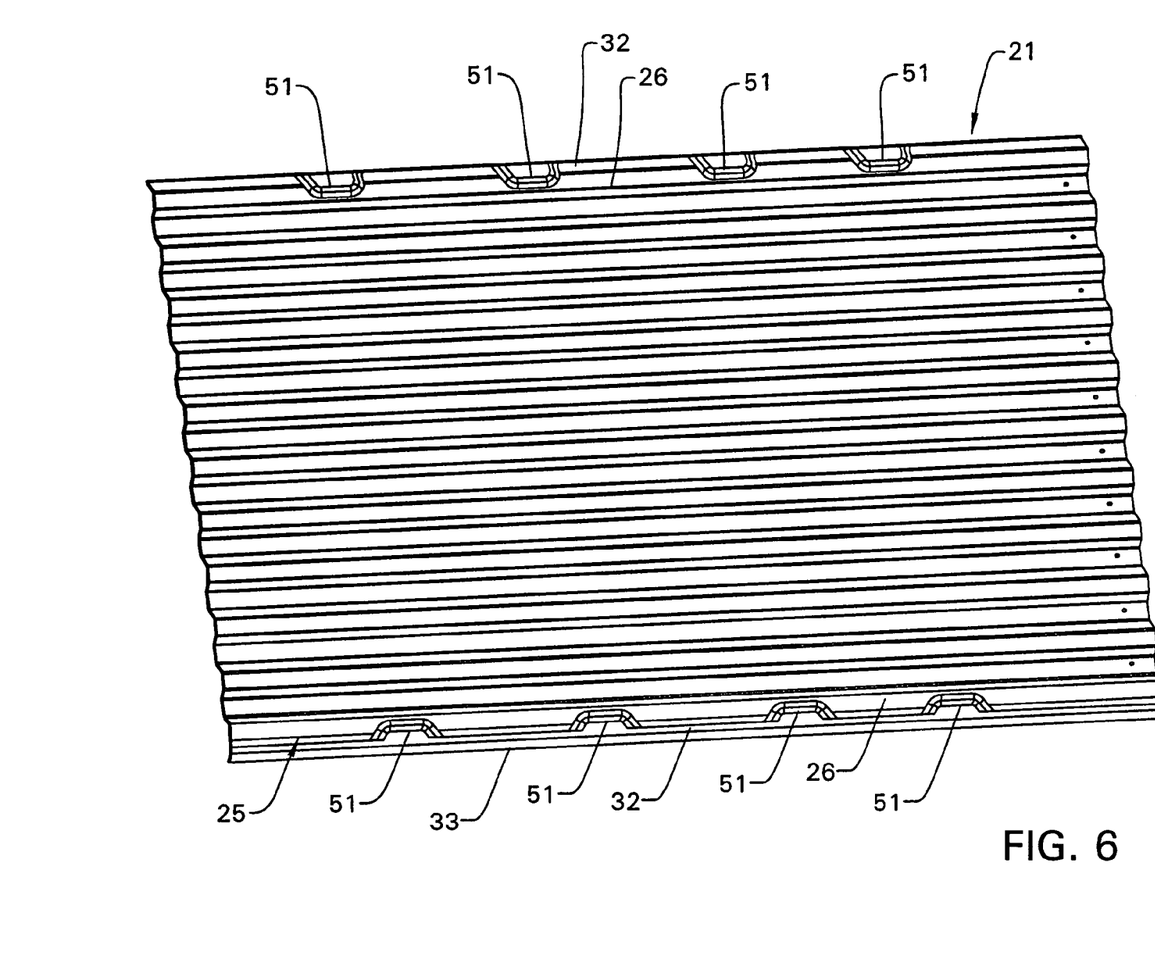
FIG. 6 is a perspective view, taken principally from above, and showing the center floor panel according to the present invention.
Figure 7:
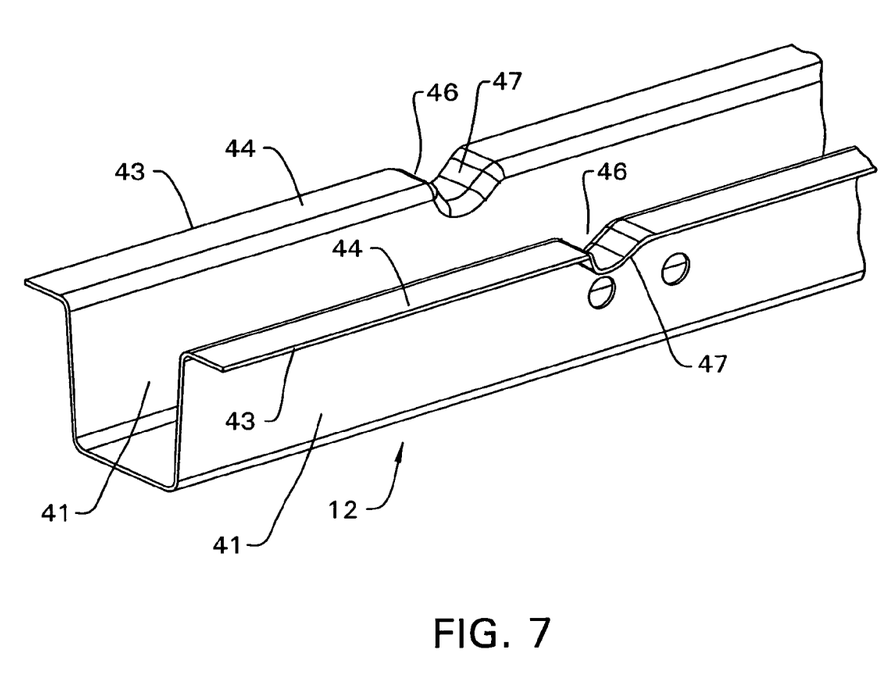
FIG. 7 is a fragmentary perspective view of the cross rail shown with a depression formed therein.
Figure 8:
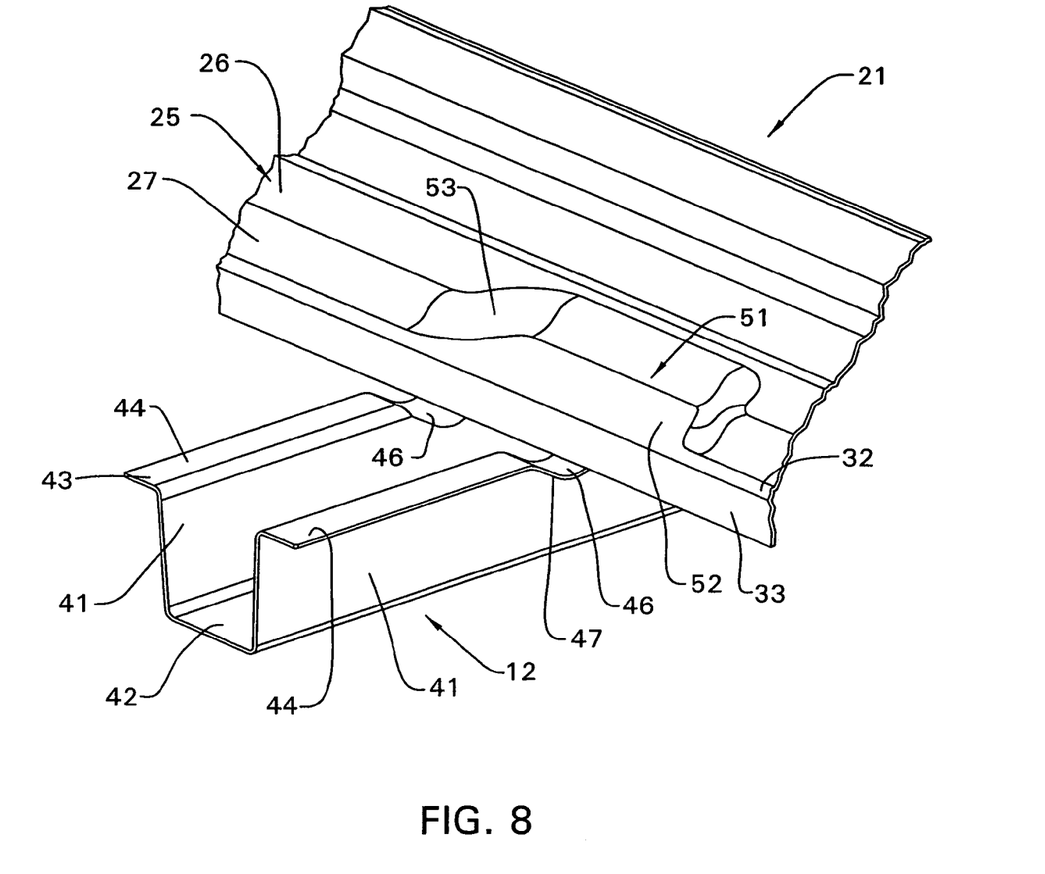
FIG. 8 is a fragmentary perspective view showing the relationship between the center floor panel and the underlying cross rail.
Figures 9, 10:
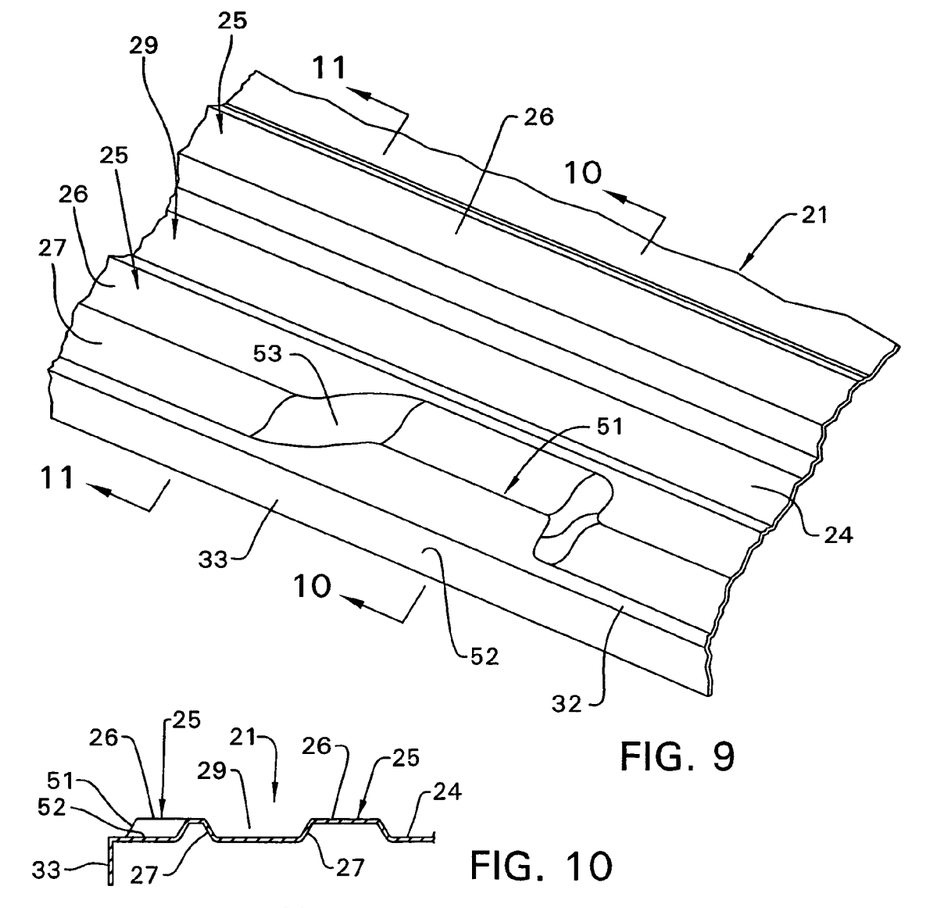
FIG. 9 is an enlarged, fragmentary perspective view showing an edge portion of the center floor panel at a location corresponding to an underlying cross rail.
FIGS. 10 and 11 are fragmentary cross sectional views taken along the lines 10—10 and 11—11, respectively, in FIG. 9.
Figure 11:
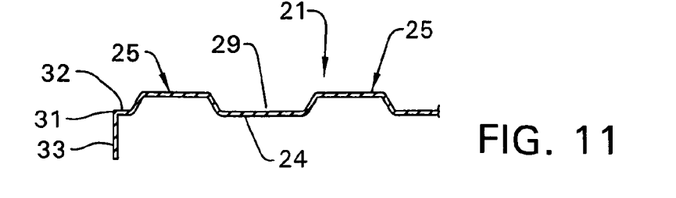

To minimize the depth and lengthwise extent of the depression 46 as formed in the cross rail, the depression 46 may and preferably is formed with a depth which is less than the depth (i.e. height) of the edge flanges 33 and 34. To provide clearance between the cross rail and edge flanges, the edge flanges are preferably provided with a shallow recess 39 (FIGS. 5, 8 and 9) opening upwardly from the lower free edge 37 thereof. This recess 39 opens upwardly from the lower edge 37 through a height which is preferably significantly less than the overall height of the flange 33, 34, with the height of the recess 39 preferably being less than one-half of the overall height of the flange 33, 34. Recess 39 also extends lengthwise along the respective flange 33, 34 through only a lengthwise extent sufficient to provide clearance at the location where the flanges and cross rail transversely intersect, with the flanges otherwise being of full height. The recess 39, at opposite lengthwise ends thereof, is joined to the lower free edge 37 through appropriate rounded end walls so as to avoid any abrupt or sharp corners.

With the construction described above, the edge flanges hence maintain their continuity lengthwise along the edges of the floor panels, and provide added strength and rigidity along the floor panel edges, even at locations where the floor panels cross the cross rails. At the same time, however, the edge flanges can be associated with and project downwardly from the base wall of the floor panel, and the depressions as formed in the cross rails are shaped and formed so as to minimize any reduction in strength and/or minimize any significant stress-raising configurations. By combining a shallower depression with an associated shallow recess in the edge flange, this tends to optimize the cooperation between the depression and edge flange by maintaining the continuity of the edge flange along the floor panel, while at the same time minimizing not only the depth of the depression but also the length of the depression in the lengthwise direction of the cross rail. This latter feature hence minimizes the length of disruption in the horizontal top flanges on the cross rail, and in cooperation with the depressions or flattened regions formed in at least one of the adjacent raised reinforcing ribs, enables the floor panels to be spot welded to these horizontal top flanges at locations positioned more closely adjacent the lengthwise free edges of the floor panels, thereby providing improved manufacturing capability and resulting strength and rigidity.

As exemplary of the preferred construction as described above, the edge flange 33, 34 may typically have a height in the neighborhood of 16 to 17 mm, which edge flange height is typically greater than the height of the channel-shaped ribs 25 formed in the floor panel. The depression 46, on the other hand, will preferably have a depth, as measured downwardly from the horizontal plane defined by the top surfaces 44, in the range of from about 10 mm to about 15 mm. Creation of the recess 39 opening upwardly from the lower free edge 37 of the edge flanges, hence enables the edge flanges to retain at least half of their height, and preferably more than half of the height, while at the same time maintaining a minimum of about 3 mm clearance between the recessed edge flange and the deformed flange sections 47 defining the depression 46.

To provide for proper and fixed securement, such as spot welding, of the floor panel members 21–23 to the top flanges 43 of the cross rails 12 in close proximity to the seams defined by the abutting edge flanges 33–34, one of the adjacent raised ribs as provided on either the center floor panel 21 or the respective side floor panel 22–23 is preferably provided with flats or depressions therein so as to facilitate spot welding of the floor panels to the top flanges 43 directly adjacent opposite longitudinal ends of the depressions 46.

In the illustrated and preferred embodiment, as shown in FIGS. 3, 3A, 6, 8 and 9, the outermost rib 25 associated with the center panel 21, namely the rib 25' positioned most closely adjacent the seam defined by the flanges 33, 34, is provided with a depression or recess 51 therein at a location corresponding to each cross rail. In the center panel illustrated in FIG. 6 there is provision for four cross rails as evidenced by the four spaced depressions 51 formed in the lengthwise extent of each sidemost rib 25'. These depressions 51 are not shown in FIG. 1 for simplicity of illustration.

As shown in greater detail in FIGS. 3, 3A, 8 and 9, the depression 51 as formed in the sidemost rib 25' is located directly over the cross rail 12, with the depression 51 extending lengthwise of the rib by a distance slightly greater than the transverse width of the cross rail 12. The depression 51 opens inwardly into the rib from the outermost side thereof (i.e., the side which joins to the base wall section 32 associated with the edge flange 33). This depression 51 in the illustrated and preferred embodiment does not project transversely through the entire width of the rib 25', but rather is defined by a concavity which is depressed downwardly from the rib top wall 26 and inwardly from the outer side wall 27 so that the depression is bounded by a side wall 53 which is of a generally arcuate or channel shaped configuration and which merges with the outer rib side wall 27. The depression 51 is formed by a suitable deforming operation, such as in a stamping press, which deforms the rib 25' downwardly so that the bottom wall 52 of the depression functions substantially as an inward coplanar extension of the base wall section 32. This base wall 52, when viewed from above as illustrated in FIG. 3, is sized so that it projects transversely inwardly to an extent beyond the inner lengthwise extent of the depressions 46 formed in the underlying cross rail 12. This enables the rearward or innermost portion of the base wall 52 to directly overlie the horizontal top surface 44 on the top flanges 43 just inwardly of the depression 46, thereby facilitating creation of spot welds, as indicated at 54, between the base wall 52 and the horizontal top flanges 43 of the cross rail.

Other spot welds 55 are also preferably provided between the base wall 38 associated with the adjacent side floor panel 22 and the flat top flanges 43 of the cross rail at a location closely adjacent the other longitudinal end of the depression 46. These spot welds 54 and 55 are hence positioned closely adjacent opposite longitudinal ends of the depression 46, and permit fixed and hence rigid securement of the adjacent floor panels to the cross rails in close proximity to and on opposite sides of the longitudinally extending seam defined by the abutting edge flanges 33–34. At the same time, however, since the depressions 51 formed in the edgemost rib 25' do not transversely penetrate across the entire width of the rib, this edgemost rib still maintains a continuous channel-shaped reinforcing configuration throughout the entire length of the center floor panel 21 so as to prevent any significant decrease with respect to the rigidity and structural integrity thereof. The above construction hence provides significantly improved joint integrity by minimizing the size and disruption created by forming of the depression in the cross rail, by minimizing any relief or recess which is formed in the abutting edge flanges where they transversely extend across the edge rail, by permitting direct spot welding of the base wall of the sidewardly adjacent floor panel members directly to the underlying top flanges of the cross rail in very close proximity to and on directly opposite sides of the abutting edge flanges, while maintaining the seam defined by the abutting edge flanges in the bottom of a valley which has the same general size or width as the other valleys associated with the floor so as to provide uniformity of appearance.

In the improved bed arrangement of the present invention, as illustrated and described herein, the cross rails 12 can be formed in any conventional manner, either by stamping or roll forming, and the depressions 46 thereafter formed therein, such as by a deforming die or a suitable stamping press. Such process preferably effects reshaping of the cross rail so as to effect forming of the depression 46 therein, without effecting any significant removal of material, while maintaining the continuous and monolithic top flanges lengthwise along the cross rail including the reshaping of these flanges so that they extend around the periphery of the depression as formed in the upstanding side walls 41. Further, if the cross rails are roll-formed, which is a preferred construction inasmuch as such is believed to permit the cross rails to be of more uniform and accurate cross section while permitting roll forming from higher strength steel, then the roll forming of the cross rails is believed to permit more economical and improved forming of the depressions 46 therein since, by using a variable roll forming device, the depressions can be formed in the cross rail as the cross rail is being formed during its movement through a multiple-stage roll forming mill.

While the above description and related drawings relate primarily to the seam connection between the adjacent side flanges on the panels 21 and 22, it will be understood that the same seam connection also exists between the adjacent side flanges on the panels 21 and 23.

While the side floor panels may be defined by separate panel members formed by roll forming or stamping, it will be appreciated that other constructions can be used. For example, the side floor panel may be part of a one-piece stamping which also includes the adjacent inner side wall and the wheel well housing. In a preferred construction, the side floor panel and the adjacent inner side wall are defined by a monolithic one-piece roll-formed member as disclosed in copending Ser. No. 11/105 330.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A bed arrangement for a vehicle, comprising:
a plurality of horizontally elongate cross rails positioned in sidewardly spaced but parallel relation and oriented to extend transverse relative to the direction of vehicle movement, at least one said cross rail having a top support flange which extends lengthwise of the cross rail and defines thereon a substantially planar top support surface;
a horizontally large floor supportingly positioned above and fixed to said cross rails, and defining thereon an upward facing load bearing surface;
said floor comprising a plurality of separate preformed panels each formed from a thin metal sheet, said panels including a horizontally large center floor panel and right and left side floor panels positioned on opposite sides of said center floor panel and in substantially coplanar relationship therewith;
said center floor panel having a generally rectangular configuration in plan view and comprising a monolithic one-piece formed metal sheet having a substantially planar base wall provided with a plurality of substantially parallel but sidewardly spaced reinforcing ribs extending longitudinally therealong and projecting upwardly therefrom;
said center floor panel having right and left longitudinally extending side edges each having an edge flange extending therealong and cantilevered substantially vertically downward;
said right and left side floor panels having respective left and right longitudinally extending side edges each having a securing flange extending therealong and cantilevered substantially vertically downward;
said securing flanges on said right and left side floor panels being positioned in adjacent and substantially abutting contact with the edge flanges of the respective right and left side edges of said center floor panel, each said securing flange and the respective adjacent edge flange being fixedly secured and defining a downward cantilevered reinforcing flange structure which extends longitudinally of the floor and projects downwardly below a bottom surface of said planar base wall;
said at least one cross rail having a pair of downward depressions formed therein and extending transversely thereacross at locations where said cross rail and said reinforcing flange structures intersect to provide clearance for the respective flange structures, each said depression projecting downwardly from the planar top surface of the top support flange and, in the lengthwise direction of the cross rail, having an arcuate upwardly-opening concave edge profile, and said top support flange extending continuously lengthwise of the cross rail and including a deformed flange section which extends along and defines the arcuate upwardly-opening concave edge profile of the depression; and
the reinforcing ribs as respectively disposed directly sidewardly adjacent the longitudinally extending side edges of the center floor panel having regions disposed directly over said at least one cross rail which are downwardly flattened so as to be substantially coplanar with said base, said downwardly flattened regions being disposed in direct supportive engagement with the planar top surface of said top support flange and spot welded thereto directly adjacent one side of a respective said depression.

2. A bed arrangement according to claim 1, wherein said downwardly flattened region opens inwardly from a side of the rib which is more closely adjacent the adjacent side edge, said downwardly flattened region extending only partway across the transverse width of the reinforcing rib.

3. A bed arrangement according to claim 2, wherein said at least one cross rail has a channel shaped main body defined by a pair of upright side walls joined by a bottom wall, and a pair of said top support flanges which extend continuously along the lengthwise extent of the cross rail, said top support flanges being horizontally cantilevered outwardly in opposite directions from upper extremities of said upright side walls, said top support flanges cooperatively defining said planar top support surface, said top support flanges defining therein sidewardly aligned deformed flange sections which define said depression for accommodating one of said reinforcing flange structures.

4. A bed arrangement according to claim 2, wherein said at least one cross rail is roll formed in the lengthwise direction thereof from high strength steel sheet.

5. A bed arrangement according to claim 2, wherein said at least one cross rail has an upwardly-opening hat-shaped cross section throughout the length thereof including throughout the lengthwise extent of the depressions.

6. A bed arrangement according to claim 5, wherein the height of the hat-shaped cross section, as it extends lengthwise of the depression, progressively decreases from one end of the depression until reaching a middle region and then progressively increases until reaching the other end of the depression.

7. A bed arrangement according to claim 6, wherein the ends of the depression are reversely curved and smoothly transition into the planar top surface of the top flanges.

8. A bed arrangement according to claim 5, wherein the adjacent side floor panel is spot welded to the planar top surface of the top flange closely adjacent the other end of the depression.

9. A bed arrangement for a vehicle, comprising:
a horizontally large floor member defined by a monolithic one-piece thin steel sheet having a plurality of raised stiffening ribs extending lengthwise thereof;
the floor member having a cantilevered down-turned edge flange extending substantially continuously along a lengthwise side edge thereof, the edge flange protruding downwardly below a bottom surface of the floor member;
a cross rail disposed transversely under said floor member for fixed supportive engagement therewith, the cross rail having a top flange which defines a planar top surface which supportingly engages the bottom surface of the floor member,
said cross rail where it crosses said edge flange having a depression formed therein to provide clearance for said edge flange, said depression projecting downwardly from said planar top surface, and said top flange having a flange section which is deformed downwardly to define the profile of the depression while maintaining the continuity of the top flange as it extends lengthwise of the cross rail;
one of the raised stiffening ribs as positioned most closely adjacent but spaced sidewardly from the edge flange having a downward depression formed therein at a location disposed substantially directly over the depression in the underlying cross rail, the depression in the raised rib defining a base wall portion which is substantially flush with the bottom surface of the floor member and which contacts the planar top flange and is spot welded thereto directly adjacent an end of the flange section which defines the depression in the cross rail.

10. A bed arrangement according to claim 9, including a horizontally large floor panel defined by a steel sheet and having a bottom surface supportively engaged on the top surface of the cross rail, the floor panel having a cantilevered down-turned securing flange extending lengthwise along a side edge thereof and protruding downward of the respective bottom surface;
said floor member and said floor panel being positioned in horizontal and sidewardly adjacent relation with the edge and securing flanges being sidewardly adjacent and in substantially abutting contact; and
said edge and securing flanges being directly fixedly joined and disposed so as to pass through said depression.

11. A bed arrangement according to claim 10, wherein the depression has an upwardly opening, smoothly curved concave profile which protrudes downwardly from said planar top surface, and said flange sections conforming to and defining the smoothly curved concave profile which defines said depression.

12. A bed arrangement according to claim 9, wherein the depression formed in said reinforcing rib extends only partway across the transverse width of the rib and opens sidewardly of the rib toward the respectively adjacent side edge of the floor panel.

13. A bed arrangement for a vehicle, comprising:
a horizontally elongate cross rail oriented to extend transverse relative to the direction of vehicle movement, said cross rail having a top support flange which extends lengthwise of the cross rail and defines thereon a substantially planar top support surface;
a horizontally large vehicle floor supportingly positioned above and fixed to said cross rail, said floor including separate preformed first and second floor panels each formed from a thin metal sheet and positioned in substantially co-planar adjacent side-by-side relationship;
said first and second floor panels respectively having first and second longitudinally extending side edges which are disposed directly adjacent and define a seam which extends in the lengthwise direction of the floor;
said first floor panel having a substantially planar base wall provided with a first reinforcing rib extending longitudinally therealong and projecting upwardly therefrom in adjacent but sidewardly spaced relationship from said first side edge so that the respective planar base wall defines a first flat base wall section extending transversely between said first reinforcing rib and said first side edge;
said second floor panel having a substantially planar base wall provided with a second reinforcing rib extending longitudinally therealong and projecting upwardly therefrom in adjacent but sidewardly spaced relationship from said second side edge so that the respective planar base wall defines a second flat base wall section extending transversely between said second reinforcing rib and said second side edge;
said first and second floor panels having respective first and second edge flanges which extend lengthwise along the respective first and second side edges and which are cantilevered vertically downwardly from the respectively adjacent flat base wall sections, said first and second edge flanges being positioned in adjacent and substantially abutting contact and being fixedly secured to define a downward cantilevered reinforcing flange structure extending longitudinally of the floor;
said one cross rail having a downward depression formed therein and extending transversely thereacross at a location where said cross rail and said reinforcing flange structure intersects to provide clearance for the flange structure, said depression projecting downwardly from the planar top surface of the top support flange and, in the lengthwise direction of said one cross rail, having an arcuate upwardly-opening concave edge profile, and said top support flange extending continuously lengthwise of the cross rail and including a deformed flange section which extends along and defines the arcuate upward-opening concave edge profile of the depression;
one of said first and second reinforcing ribs having a region disposed directly over said one cross rail which is downwardly flattened so as to be substantially co-planar with said base wall and disposed in direct supportive engagement with the planar top surface of said top support flange adjacent one side of said depression, said downwardly flattened region opening inwardly from a side of the respective reinforcing rib which is disposed adjacent the respective side edge, said downwardly flattened region extending transversely only partway across the transverse width of the reinforcing rib;
a first spot weld formed between said downwardly flattened region and said top support flange of said cross rail adjacent one side of said depression; and
a second spot weld formed between the flat base wall section of the other floor panel and the top support flange of said cross rail adjacent the other side of said depression.

14. A bed arrangement according to claim 13, wherein said cross rail has an upwardly-opening hat-shaped cross section and includes a sidewardly spaced pair of said top support flanges, said depression extending transverse across said cross rail so that both of said top support flanges are deformed to define a depression therein having said upwardly-opening concave configuration, and said first and second spot welds being created at each of said top support flanges adjacent opposite sides of the respective depression.

15. The bed arrangement according to claim 13, wherein the first flat base wall section has a transverse width which is substantially less than the transverse width of the second flat base wall section, and wherein said second spot weld is formed directly in said second flat base wall section.

16. The bed arrangement according to claim 15, wherein said first floor panel has a plurality of said reinforcing ribs formed in sidewardly spaced but parallel relationship and extending lengthwise thereof, the ribs of said first floor panel being sidewardly spaced by intermediate valleys which have a transverse size which substantially corresponds to the transverse width defined between said first and second reinforcing ribs.

* * * * *